(12) United States Patent
Shimizu et al.

(10) Patent No.: US 8,415,428 B2
(45) Date of Patent: Apr. 9, 2013

(54) THERMOPLASTIC ELASTOMER COMPOSITION AND METHOD FOR PRODUCING THE SAME

(75) Inventors: Daisuke Shimizu, Tokyo (JP); Yasuhiro Kusanose, Tokyo (JP); Yoshifumi Araki, Tokyo (JP); Masahiro Fujiwara, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/865,407

(22) PCT Filed: Feb. 4, 2009

(86) PCT No.: PCT/JP2009/051894
§ 371 (c)(1),
(2), (4) Date: Jul. 30, 2010

(87) PCT Pub. No.: WO2009/099105
PCT Pub. Date: Aug. 13, 2009

(65) Prior Publication Data
US 2011/0003928 A1 Jan. 6, 2011

(30) Foreign Application Priority Data
Feb. 8, 2008 (JP) ................................. 2008-028373

(51) Int. Cl.
*C08L 53/02* (2006.01)
*C08L 77/00* (2006.01)

(52) U.S. Cl.
USPC ................... 525/63; 525/64; 525/65; 525/66; 525/67; 525/98; 525/99; 525/92 R

(58) Field of Classification Search .................... 525/63, 525/64, 65, 66, 67, 71, 98, 99, 92 R
See application file for complete search history.

(56) References Cited

U.S. PATENT DOCUMENTS

| | | | |
|---|---|---|---|
| 3,281,383 A | 10/1966 | Zelinski et al. | |
| 4,603,155 A | 7/1986 | Muramori et al. | |
| 5,187,236 A | 2/1993 | Coolbaugh et al. | |
| 5,393,841 A | 2/1995 | Himes et al. | |
| 5,438,102 A | 8/1995 | Brandes et al. | |
| 5,470,914 A | 11/1995 | Coolbaugh et al. | |
| 5,929,165 A | 7/1999 | Tasaka et al. | |
| 2005/0234193 A1* | 10/2005 | Sasagawa et al. | 525/88 |
| 2009/0312449 A1 | 12/2009 | Sasaki et al. | |

FOREIGN PATENT DOCUMENTS

| | | |
|---|---|---|
| GB | 1436812 | 5/1976 |
| JP | 36-19286 | 10/1936 |
| JP | 43-17979 | 7/1943 |
| JP | 46-32415 | 9/1971 |
| JP | 48-2423 | 1/1973 |
| JP | 48-4106 | 2/1973 |
| JP | 49-36957 | 10/1974 |
| JP | 51-49567 | 12/1976 |
| JP | 56-28925 | 7/1981 |
| JP | 59-131613 | 7/1984 |
| JP | 59-166518 | 9/1984 |
| JP | 60-186577 | 9/1985 |
| JP | 6-93059 | 4/1994 |
| JP | 7-188361 | 7/1995 |
| JP | 7-116271 | 12/1995 |
| JP | 8-225713 | 9/1996 |
| JP | 8-512067 | 12/1996 |
| JP | 2000-109640 | 4/2000 |
| JP | 2004-197035 | 7/2004 |
| JP | 2004-210933 | 7/2004 |
| TW | 200745250 A | 12/2007 |

OTHER PUBLICATIONS

Chinese Office Action that issued with respect to patent family member Chinese Patent Application No. 200980104080.2 dated Sep. 9, 2011.
U.S. Appl. No. 12/921,180 to Masahiro Fujiwara et al., which application is the National Stage of PCT/JP2009/055837, filed Mar. 24, 2009.
Kolthoff et al., "Determination of Polystyrene in GR-S Rubber" *Journal of Polymer Science* vol. 1, No. 5, pp. 429-433, 1946.
International Search Report for PCT/JP2009/051894, mailed May 19, 2009.
International Preliminary Report on Patentability for PCT/JP2009/051894, issued Sep. 7, 2010.
Search report from E.P.O. that issued with respect to patent family member European Patent Application No. 09709376.9, mail date is May 24, 2011.
English version of International Preliminary Report on Patentability for PCT/JP2009/051894, mailed Sep. 7, 2010.

\* cited by examiner

*Primary Examiner* — Jeffrey Mullis
(74) *Attorney, Agent, or Firm* — Greenblum & Bernstein, P.L.C.

(57) ABSTRACT

The present invention provides a thermoplastic elastomer composition obtained by dynamically crosslinking, under a melting condition, 100 parts by mass of a block copolymer (I), 1 to 1,000 parts by mass of a polar resin (II), 1 to 500 parts by mass of a modified polymer (III), and 0.01 to 50 parts by mass of a crosslinking agent (IV), wherein the block copolymer (I) comprises at least one polymer block (A) comprising as a main component an alkylene unit, and/or at least one copolymer block (B) comprising as main components an alkylene unit (b-1) and a vinyl aromatic monomer unit (b-2), and comprises at least one unsaturated block (C) comprising as a main component a conjugated diene monomer unit having 5 or more carbon atoms at an end.

19 Claims, No Drawings

THERMOPLASTIC ELASTOMER COMPOSITION AND METHOD FOR PRODUCING THE SAME

TECHNICAL FIELD

The present invention relates to a thermoplastic elastomer composition and a method for producing the same.

BACKGROUND ART

In recent years, a thermoplastic elastomer which has rubber elasticity, requires no vulcanization step, and can be molded and recycled similar to a thermoplastic resin is frequently used in the field of automobile parts, household appliance parts, wire coverings, medical parts, miscellaneous goods, footwear, and the like.

Especially, a hydrogenated product of a block copolymer containing a diene-based polymer block as a soft segment in a polymer chain (hereinafter, referred to as a hydrogenated block copolymer) has elasticity and feeling close to that of conventional vulcanized rubber. Therefore, it is expected to be applied as a raw material for molded articles in which vulcanized rubber has so far been used.

However, although the above hydrogenated block copolymer has rubber elasticity at ordinary temperature and can be easily molded by plasticizing and melting by heating, its heat resistance, oil resistance, and rubber elasticity under high temperatures cannot be said to be satisfactory. Therefore, there is a problem that the hydrogenated block copolymer cannot be used for applications where such properties are highly required.

In view of the problem, several proposals have been made on an elastomeric composition using the hydrogenated block copolymer.

For example, there has been proposed a technique of improving compression set under high temperatures by crosslinking an elastomeric composition in which the hydrogenated block copolymer is blended with a hydrocarbon oil, an olefin-based polymer and the like, using a crosslinking agent such as an organic peroxide and a crosslinking auxiliary (for example, refer to Patent Documents 1 to 3).

There has also been proposed a technique of improving oil resistance and rubber elasticity at high temperatures by crosslinking an elastomeric composition in which the hydrogenated block copolymer, a functionalized hydrogenated block copolymer, a polyamide resin, a hydrocarbon oil and the like are blended with each other, using a crosslinking agent such as an organic peroxide and a crosslinking auxiliary (for example, refer to Patent Document 4).

However, although crosslinked elastomeric compositions containing a conventional hydrogenated block copolymer as described above have recyclability which is a feature of a thermoplastic elastomer, a soft segment composed of a conjugated diene monomer block of the hydrogenated block copolymer is excessively crosslinked. As a result, there is a problem that the elongation of the resulting composition is significantly reduced, which poses a problem in the development of high rubber elasticity.

On the other hand, Patent Document 5 described below proposes a hydrogenated block copolymer having a block containing an unsaturated group at a molecular chain end, and it describes, as an Example, a hydrogenated block copolymer composition having a styrene/isoprene copolymer block at a molecular end.

However, according to this technique, the size of the block containing styrene monomer units is designed very small, which poses a problem of reducing the cohesion of styrene blocks and increasing the compression set of the hydrogenated block copolymer.

Patent Document 1
Japanese Patent Application Laid-Open Publication No. 59-131613
Patent Document 2
Japanese Patent Application Laid-Open Publication No. 08-225713
Patent Document 3
Japanese Unexamined Patent Application Publication No. 2000-109640
Patent Document 4
Japanese Unexamined Patent Application Publication No. 2004-197035
Patent Document 5
Japanese Examined Patent Application Publication No. 07-116271

DISCLOSURE OF THE INVENTION

Problems to be Solved by the Invention

Thus, it is an object of the present invention to provide a thermoplastic elastomer composition having good heat resistance, good oil resistance, and high rubber elasticity under high temperatures, and also excellent in molding processability.

Means for Solving the Problems

As a result of intensive research to solve the above problems, the present inventors have completed the present invention by finding that these problems can be solved by dynamically crosslinking a block copolymer (I) having a specific block structure with a polar resin (II) and a modified polymer (III) while melt kneading these components.

Specifically, the present invention is as described below.

There is provided a thermoplastic elastomer composition obtained by dynamically crosslinking, under a melting condition, 100 parts by mass of a block copolymer (I), 1 to 1,000 parts by mass of a polar resin (II), 1 to 500 parts by mass of a modified polymer (III), and 0.01 to 50 parts by mass of a crosslinking agent (IV),
wherein the block copolymer (I) comprises at least one polymer block (A) comprising as a main component an alkylene unit, and/or at least one copolymer block (B) comprising as main components an alkylene unit (b-1) and a vinyl aromatic monomer unit (b-2) and comprises at least one unsaturated block (C) comprising as a main component a conjugated diene monomer unit having 5 or more carbon atoms at at least one end.

There is also provided the thermoplastic elastomer composition wherein the block copolymer (I) further comprises 2 or more polymer blocks (D) each comprising as a main component a vinyl aromatic monomer unit.

There is also provided the thermoplastic elastomer composition wherein the block copolymer (I) comprises at least one polymer block (D) comprising as a main component a vinyl aromatic monomer unit at at least one end.

There is also provided the thermoplastic elastomer composition wherein the block copolymer (I) comprises at least one polymer block (D) comprising as a main component a vinyl aromatic monomer unit at each of both ends.

There is also provided the thermoplastic elastomer composition wherein the block copolymer (I) comprises the polymer block (D) comprising as a main component a vinyl aromatic monomer unit at an end of the block copolymer (I), and the at least one unsaturated block (C) comprising as a main component a conjugated diene monomer unit having 5 or more carbon atoms is internally bonded to the vinyl aromatic block (D).

There is also provided the thermoplastic elastomer composition wherein the block copolymer (I) comprises polymer blocks(D) each comprising as a main component a vinyl aromatic monomer unit at both ends of the block copolymer (I), and the unsaturated block (C) comprising as a main component a conjugated diene monomer unit having 5 or more carbon atoms is internally bonded to each of the vinyl aromatic blocks (D).

There is also provided the thermoplastic elastomer composition wherein a conjugated diene of the unsaturated block (C) is isoprene.

There is also provided the thermoplastic elastomer composition wherein a content of the unsaturated block (C) in the block copolymer (I) is from 0.1 to 20% by mass.

There is also provided the thermoplastic elastomer composition according to any one of claims 1 to 8, wherein the block copolymer (I) is a hydrogenated block copolymer obtained by hydrogenation reaction of a non-hydrogenated block copolymer.

There is also provided the thermoplastic elastomer composition wherein a vinyl bond content of all the conjugated dienes contained in the non-hydrogenated block copolymer is from 15 to 80%.

There is also provided the thermoplastic elastomer composition wherein a content of the vinyl aromatic monomer in the block copolymer (I) is from 5 to 70% by mass.

There is also provided the thermoplastic elastomer composition wherein the modified polymer (III) is a modified polymer having at least one functional group selected from the group consisting of a maleic anhydride group, an epoxy group, primary to tertiary amino groups, a carboxyl group, and a hydroxy group.

There is also provided the thermoplastic elastomer composition wherein the polar resin (II) is at least one polar thermoplastic resin selected from the group consisting of a polyester-based resin, a polyamide-based resin, a polycarbonate-based resin, a polyurethane-based resin, a polyphenylene ether-based resin, and a polyoxymethylene-based resin.

There is also provided the thermoplastic elastomer composition wherein the crosslinking agent (IV) is a phenol resin-based crosslinking agent or an organic peroxide-based crosslinking agent.

There is also provided the thermoplastic elastomer composition comprising from 0 to 300 parts by mass of a rubber softener (V).

There is also provided a method for producing a thermoplastic elastomer composition comprising the step of dynamically crosslinking, under a melting condition, using a twin-screw extruder, 100 parts by mass of a block copolymer (I), 1 to 1,000 parts by mass of a polar resin (II), 1 to 500 parts by mass of a modified polymer (III), and 0.01 to 50 parts by mass of a crosslinking agent (IV), wherein the block copolymer (I) comprises at least one polymer block (A) comprising as a main component an alkylene unit, and/or at least one copolymer block (B) comprising as main components an alkylene unit (b-1) and a vinyl aromatic monomer unit (b-2), and comprises at least one unsaturated block (C) comprising as a main component a conjugated diene monomer unit having 5 or more carbon atoms at at least one end.

Advantages of the Invention

The present invention provides a thermoplastic elastomer composition having good heat resistance, oil resistance, and rubber elasticity under high temperatures and also having good molding processability and flexible and good rubber properties.

BEST MODE FOR CARRYING OUT THE INVENTION

Hereinafter, the best mode for performing the present invention (hereinafter "the present embodiment") will be described in detail. Note that the present invention is not limited to the following embodiments but can be implemented by modifying them in various ways within the scope of the present invention.

Note that, in the present specification, the nomenclature of each monomer unit constituting a copolymer follows the nomenclature of a monomer from which the monomer unit is derived.

For example, an "alkylene unit" refers to a monoolefin unit such as an ethylene unit, a propylene unit, a butylene unit, a hexylene unit, and an octylene unit. Especially, an ethylene unit, a propylene unit, and a butylene unit are preferred in terms of economy. These may be used singly or in combination of two or more. The "alkylene unit" also includes a monomer unit obtained by hydrogenating a conjugated diene monomer unit.

A "vinyl aromatic monomer unit" means a constitutional unit of a polymer produced as a result of polymerization of a vinyl aromatic compound which is a monomer. The structure is a molecular structure in which 2 carbons of a substituted ethylene group derived from a substituted vinyl group serve as a binding site.

A "conjugated diene monomer unit" means a constitutional unit of a polymer produced as a result of polymerization of a conjugated diene which is a monomer. The structure is a molecular structure in which 2 carbons of olefin derived from a conjugated diene monomer serve as a binding site.

In the present specification, "comprising as a main component" means containing 60% by mass or more of a monomer unit in a copolymer. It is preferable to contain 80% by mass or more of a monomer unit, more preferably 90% by mass or more, further preferably 95% by mass or more.

Further, in a "copolymer" in the present specification, 2 or more types of monomer units may be distributed uniformly, or may be distributed in a tapered, staircase, convex, or concave shape.

Furthermore, a crystal part may be present in a polymer block, and a plurality of segments in which the content of one or more monomer units is different may be present as well.

The thermoplastic elastomer composition in the present embodiment is a thermoplastic elastomer composition obtained by dynamically crosslinking, under a melting condition, a composition comprising 100 parts by mass of a block copolymer (I), 1 to 1,000 parts by mass of a polar resin (II), 1 to 500 parts by mass of a modified polymer (III), and 0.01 to 50 parts by mass of a crosslinking agent (IV).

The block copolymer (I) comprises at least one polymer block (A) comprising as a main component an alkylene unit, and/or at least one copolymer block (B) comprising as main components an alkylene unit (b-1) and a vinyl aromatic monomer unit (b-2), and comprises at least one unsaturated block (C) comprising as a main component a conjugated diene monomer unit having 5 or more carbon atoms at least one end.

The block copolymer (I) further comprises 2 or more polymer blocks (D) each comprising as a main component a vinyl aromatic monomer unit, which is preferred in terms of molding processability.

[Block Copolymer (I)]

The block copolymer (I) is, for example, a linear block copolymer represented by the general formula:

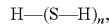

or a linear block copolymer or a radial block copolymer represented by the general formulas:

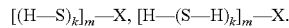

In the above formulas, H represents a homoblock of C, a homoblock of D, a block copolymer of C-D or D-C, or a copolymer block of C and D (C/D), as a main component. H may be the same or different.

Moreover, S represents a homoblock of A, a homoblock of B, or a block copolymer of B-A or A-B, as a main component. S may be the same or different.

For example, the block copolymer (I) also includes a block structure of the D-C-B-D-C type or the C/D-A-B-D-C type.

Moreover, n and k are each an integer of 1 to 5, and m is an integer of 2 to 6.

X represents a residue of a coupling agent, or a residue of a polyfunctional initiator.

Each of the polymer blocks A, B, C, and D present in the block copolymer may have structures such as molecular weight and composition that are the same or different with each other.

The A, B, C, and D mean "at least one polymer block (A) comprising as a main component an alkylene unit", "at least one copolymer block (B) comprising as main components an alkylene unit (b-1) and a vinyl aromatic monomer unit (b-2)", "at least one unsaturated block (C) comprising as a main component a conjugated diene monomer unit having 5 or more carbon atoms at least one end", and "2 or more polymer blocks (D) each comprising as a main component a vinyl aromatic monomer unit", respectively.

The mass percentage of the polymer block D comprising as a main component a vinyl aromatic monomer unit and the polymer block C contained in the polymer block H is not particularly limited. However, the mass percentage of the polymer block D is preferably 60% by mass or more based on the polymer block H, that is, the mass percentage of the polymer block C is preferably 40% by mass or less, from the viewpoint of preventing stickiness and polymer fusion (blocking) of the block copolymer (I) and ensuring high productivity of the block copolymer (I), and from the viewpoint of improving the compression set of the thermoplastic elastomer composition as a final target. Further, the mass percentage of the polymer block D is preferably 99% by mass or less, that is, the mass percentage of the polymer block C is preferably 1% by mass or more, in terms of introducing a certain number of unsaturated groups into the block copolymer (I) and giving effective crosslinking reactivity thereto. The mass percentage (C/H) of the polymer block C is more preferably 2 to 25% by mass, further preferably 5 to 20% by mass.

In addition, H is more preferably a perfect block copolymer of D-C or C-D in terms of compression set.

The polymer block (D) is a polymer block comprising as a main component a vinyl aromatic monomer unit and may be a copolymer of a plurality of vinyl aromatic monomer units. In this case, these units may be uniformly distributed in the polymer block (D) or may be non-uniformly distributed (for example, in a tapered shape) therein.

A plurality of uniformly distributed portions and/or non-uniformly distributed portions may coexist in the polymer block (D).

The content of the polymer block (D) is not particularly limited, but the content is preferably 5 to 70% by mass based on the total mass of the block copolymer in terms of the mechanical properties and rubber properties of the block copolymer (I).

The content of the polymer block D is preferably 70% by mass or less in order to improve the flexibility and rubber properties of the block copolymer (I) and the mechanical properties, the rubber properties and flexibility of the thermoplastic elastomer composition as a final target.

On the other hand, the content of the polymer block (D) is preferably 5% by mass or more, more preferably in the range of 10 to 60% by mass, further preferably in the range of 12 to 40% by mass, in terms of the handlability (non-tackiness), productivity, and processability of the block copolymer (I).

The polymer block (C) is a polymer block comprising as a main component a conjugated diene monomer unit having 5 or more carbon atoms and may be a copolymer of a plurality of conjugated diene monomer units each having 5 or more carbon atoms. These conjugated diene monomer units may be uniformly distributed in the polymer block (C) or may be non-uniformly distributed (for example, in a tapered shape) therein. A plurality of uniformly distributed portions and/or non-uniformly distributed portions may coexist in the polymer block (C).

The polymer block (C) is preferably a perfect block copolymer having 5 or more conjugated diene monomer units from the viewpoint of reducing the compression set of the thermoplastic elastomer composition as a final target.

The content of the polymer block (C) is preferably 0.1 to 20% by mass based on the total mass of the block copolymer (I). The content of the polymer block (C) is preferably 20% by mass or less from the viewpoint of improving the oxidation stability, thermal stability, productivity, and processability of the block copolymer (I) and in turn the thermoplastic elastomer composition as a final target. The content of the polymer block (C) is preferably 0.1% by mass or more, more preferably in the range of 0.5 to 15% by mass, further preferably in the range of 1 to 10% by mass in terms of crosslinking reactivity.

The polymer block (A) included in the polymer block S is a polymer block comprising as a main component an alkylene unit having 4 or more carbon atoms and may be a copolymer of a plurality of alkylene units each having 4 or more carbon atoms. These alkylene units may be uniformly distributed in the polymer block (A) or may be non-uniformly distributed (for example, in a tapered shape) therein. A plurality of uniformly distributed portions and/or non-uniformly distributed portions may coexist in the polymer block (A).

The polymer block (A) is preferably a perfect block copolymer having alkylene units each having 4 or more carbon atoms from the viewpoint of reducing the compression set of the thermoplastic elastomer composition as a final target.

The content of the polymer block (A) is preferably 10 to 90% by mass based on the total mass of the block copolymer (I). The content of the polymer block (A) is more preferably 25 to 85% by mass, further preferably 30 to 80% by mass in terms of the productivity, processability and the like of the block copolymer (I).

The method for producing the polymer block (A) is not particularly limited, but the polymer block (A) is obtained, for example, by hydrogenating a polymer block comprising as a main component a conjugated diene monomer unit having 4 or more carbon atoms.

In this case, the vinyl bond content of the conjugated diene is preferably 15 to 80%, and the crystallinity thereof is preferably 10% or more.

The degree of hydrogenation of the double bond of the conjugated diene monomer unit which is an olefinic unsaturated double bond is preferably 80% or more from the viewpoint of improving the oxidation stability, thermal stability, and elongation at break of the thermoplastic elastomer composition as a final target. The degree of hydrogenation is preferably 85% or more, more preferably 90% or more, further preferably 95% or more.

The copolymer block (B) is a copolymer block comprising as main components an alkylene unit (b-1) having 4 or more carbon atoms and a vinyl aromatic monomer unit (b-2).

Introduction of the copolymer block (B) is preferred because it can improve the vibration-damping properties, scratch resistance, and abrasion resistance of the block copolymer (I).

The percentage of the vinyl aromatic monomer unit (b-2) contained in the copolymer of the polymer block (B) is preferably 30% by mass or more, and it is more preferably 50% by mass or more in order to improve the abrasion resistance of the thermoplastic elastomer composition as a final target.

Further, the vinyl bond content of all the conjugated dienes of the polymer block (B) in the block copolymer (I) is preferably 10 to 50%.

The polymer block (A) and the copolymer block (B) included in the polymer block S are each preferably contained in the amount of zero to 85% by mass based on the block copolymer (I). More preferably, the content of the polymer block (A) and/or the copolymer block (B) is 2 to 80% by mass in terms of the productivity and processability of the block copolymer (I). Further preferably, the sum of the content of the polymer block (A) and the content of the copolymer block (B) is 25 to 85% by weight.

In the present specification, with respect to the "end" of the block structure in the block copolymer, the outermost block and a block internally bonded thereto are collectively defined as an "end".

Here, "internally bonded" means being coupled to the inside of the block located at the outside via a chemical bond.

For example, in the case of a structure such as D-C-A-C-D having a polymer block C as an unsaturated block, "the polymer block (C) is present at the end of the block copolymer (I)" because the polymer block C is coupled to the inside of the polymer block D via a chemical bond.

Further, in the case of a D/C-A-B-D/C type structure, "the polymer block (C) is present at the end of the block copolymer (I)".

The block copolymer (I) has at least one, more preferably 2 or more unsaturated blocks (C) at the end thereof. Particularly, the block copolymer (I) preferably has at least one, more preferably 2 or more unsaturated blocks between the polymer block D (hard segment) at the end and the internal polymer block A and/or copolymer block B (soft segment).

For example, the block copolymer (I) is a block copolymer (D-C-A-C-D) which has at the both ends thereof polymer blocks (D) each comprising as a main component a vinyl aromatic monomer unit as a hard segment, contains in the inside thereof a polymer block (A) comprising as a main component an alkylene unit having 4 or more carbon atoms as a soft segment, and contains each polymer block (C) comprising as a main component a conjugated diene monomer unit having 5 or more carbon atoms between the polymer block (D) and the polymer block (A). Since such a block copolymer can take a very clear microphase-separated structure, the polymer block (D) comprising as a main component a vinyl aromatic monomer unit has a stronger cohesion. As a result, the compression set of the block copolymer (I) can be improved. Thereby, the improvement in the compression set of the thermoplastic elastomer composition as a final target is achieved.

Moreover, in the case of a type in which the block copolymer (I) contains a plurality of polymer blocks (C) each comprising as a main component a conjugated diene monomer unit having 5 or more carbon atoms not only at both ends but inside the molecular chain thereof (for example, D-C-A-C-A-C-D), the oil resistance of the block copolymer can be significantly improved because small crosslinking points are introduced into the soft segment. Thereby, the improvement in the oil resistance of the thermoplastic elastomer composition as a final target is achieved.

In the present specification, "unsaturated block" refers to a polymer block having an olefinic unsaturated double bond and mainly means a polymer block (C), which is characterized by a high proportion of unsaturated bonds present in the block.

Therefore, when the block copolymer (I) is obtained by hydrogenation reaction, the conjugated diene monomer unit having 5 or more carbon atoms used for the polymer block (C) needs to be selected so that it has a lower hydrogenation rate than the conjugated diene monomer unit having 4 or more carbon atoms which has been introduced for conversion to the polymer block (A) or the copolymer block (B) by hydrogenation. The degree of hydrogenation of the double bond of the conjugated diene monomer unit which is an olefinic unsaturated double bond in the polymer block (A) or the copolymer block (B) is preferably 80% or more, more preferably 90% or more, further preferably 95% or more, in terms of oxidation stability, thermal stability, and elongation at break. On the other hand, the degree of hydrogenation of the double bond of the conjugated diene monomer unit having 5 or more carbon atoms in the polymer block (C) is preferably 60% or less, more preferably 40% or less, further preferably 20% or less, in order to impart sufficient crosslinking reactivity to the polymer block (C).

When the polymer block H is a copolymer block (C/D) comprising as main components a conjugated diene monomer unit having 5 or more carbon atoms and a vinyl aromatic monomer unit, this polymer block is also included in the "unsaturated block."

The weight-average molecular weight of the block copolymer (I) can be measured using GPC (gel permeation chromatography). The weight-average molecular weight in terms of polystyrene is preferably 5,000 to 2,000,000, more preferably 10,000 to 1,000,000, further preferably 30,000 to 500,000, in terms of the balance of the productivity, processability, mechanical strength, and compression set of the thermoplastic composition of the present embodiment as a final target.

Note that the molecular weight distribution (Mw/Mn) (ratio of the weight-average molecular weight (Mw) to the number average molecular weight (Mn)) of the block copolymer (I) is preferably 10 or less, more preferably 1.01 to 5, further preferably 1.01 to 2, in terms of the balance of the processability and mechanical strength of the thermoplastic composition of the present embodiment as a final target.

With respect to the weight-average molecular weight, the measurement by gel permeation chromatography (GPC) is performed, and the resulting molecular weight of the peak in the chromatogram is converted using a calibration curve determined from the measurement of commercial standard polystyrene (prepared using a peak molecular weight of the standard polystyrene) to determine the weight-average molecular weight.

The molecular weight distribution of the block copolymer (I) can be similarly determined from the measurement by GPC.

When the block copolymer (I) is obtained by hydrogenation reaction, the microstructure (the percentage of cis, trans, and vinyl) of the conjugated diene monomer unit portion in the non-hydrogenated block copolymer before hydrogenation can be arbitrarily changed by using a polar compound or the like. For example, when 1,3-butadiene is used as the conjugated diene, the 1,2-vinyl bond content is generally 5 to 90%, and when isoprene is used as the conjugated diene, the 3,4-vinyl bond content is generally 3 to 80%. However, in terms of the productivity of the block copolymer (I), when 1,3-butadiene is used as the conjugated diene, the 1,2-vinyl bond content is preferably 15 to 80%, more preferably 20 to 78%, further preferably 25 to 75%. When isoprene is used as the conjugated diene, the 3,4-vinyl bond content is preferably 5 to 70%.

The conjugated diene refers to a diolefin having a pair of conjugated double bonds. Examples of the conjugated diene contained in the polymer block (A) and/or the copolymer block (B) include 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene, and 1,3-cyclohexadiene. These may be used singly or in combination of two or more. Particularly, 1,3-butadiene is preferred, and the polymer block (A) is preferably a homoblock of the conjugated diene from the viewpoint of reducing the compression set of the thermoplastic elastomer composition as a final target.

Further, examples of the conjugated diene contained in the polymer block (C) include isoprene, 2,3-dimethyl-butadiene, 2-methyl-1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene, and 1,3-cyclohexadiene. These may be used singly or in combination of two or more. In particular, isoprene and 1,3-cyclohexadiene are preferred.

In addition, the conjugated diene used for the polymer blocks (A), (B), and (C) preferably has 15 or less carbons.

Examples of the vinyl aromatic monomer unit include vinyl aromatic compounds such as styrene, o-methylstyrene, p-methylstyrene, p-tert-butyl styrene, 1,3-dimethylstyrene, α-methyl styrene, vinylnaphthalene, vinylanthracene, divinylbenzene, 1,1-diphenylethylene, N,N-dimethyl-p-aminoethyl styrene, and N,N-diethyl-p-aminoethyl styrene. These may be used singly or in combination of two or more. In particular, styrene is preferred from the viewpoint of economy.

All the monomer species having anionic polymerizability are applicable to the remaining components other than the component used as a "main component" contained in each polymer block which constitutes the block copolymer (I) as described above.

Further, the block copolymer (I) may contain other polymer blocks as long as they are not beyond the scope as described above.

When the block copolymer (I) is produced by hydrogenation, the content of the vinyl aromatic monomer unit in the block copolymer (I) can be determined by an ultraviolet spectrophotometer or the like.

Further, the content of the conjugated diene monomer unit, the vinyl bond content based on the conjugated diene monomer unit, and the degree of hydrogenation are determined by using a nuclear magnetic resonance spectrometer (NMR).

The molecular weight of a homopolymer block of the vinyl aromatic monomer unit is determined by measuring, with an ultraviolet spectrophotometer and GPC, the components of the homopolymer block (here, the components having a polymerization degree of 30 or less are excluded) of the vinyl aromatic monomer unit obtained by decomposing a block copolymer before hydrogenation, according to a method (I. M. KOLTHOFF, et al., J. Polym. Sci. 1, 429 (1946)) of oxidatively decomposing the block copolymer by di-tert-butyl hydroperoxide using osmium tetroxide as a catalyst. The content can be determined by an ultraviolet spectrophotometer or the like.

A known method is applicable to the method for producing the block copolymer (I), and examples thereof include those methods described in Japanese Examined Patent Application Publication Nos. 36-19286, 43-17979, 46-32415, 49-36957, 48-2423, 48-4106, 56-28925, and 51-49567, and Japanese Patent Application Laid-Open Publication Nos. 59-166518 and 60-186577.

[Polar resin (II)]

The polar resin (II) refers to various synthetic resins each having a polar group in the polymer chain and includes engineering plastics and super engineering plastics.

Examples of the polar resin (II) include a polyamide-based resin, a polyester-based resin, a polycarbonate-based resin, a polyurethane-based resin, a polyphenylene ether-based resin, a polyoxymethylene-based resin, a polyimide-based resin, a polyketone-based resin, a polysulfone-based resin, a polyphenylene sulfide-based resin, and a polyarylate-based resin.

By blending the polar resin (II), excellent heat resistance, oil resistance, chemical resistance, formability, and the like can be imparted to the resulting thermoplastic elastomer composition.

The blending amount of the polar resin (II) in the thermoplastic elastomer composition of the present embodiment is 1 to 1,000 parts by mass, preferably 10 to 500 parts by mass, more preferably 20 to 200 parts by mass, based on 100 parts by mass of the block copolymer (I). When the blending amount exceeds 1,000 parts by mass, the flexibility of the thermoplastic elastomer composition tends to be reduced.

[Modified Polymer (III)]

The thermoplastic elastomer composition of the present embodiment contains a modified polymer (III).

The modified polymer (III) is a polymer having a functional group.

Examples of polymers constituting the modified polymer (III) include polyolefines (such as polyethylene, polypropylene, poly(ethylene/propylene), poly(ethylene/butylene), and poly(ethylene/octene)), copolymers made of an olefin and a polar monomer copolymerizable with the olefin (such as ethylene/glycidyl methacrylate copolymers, ethylene/vinyl alcohol copolymers, and ethylene/acrylic acid copolymers), natural rubber, isobutylene-isoprene rubber, styrene-isobutylene-styrene copolymers, polybutadiene, styrene-butadiene rubber, styrene-conjugated diene-styrene copolymers, and hydrogenated products or partially hydrogenated products thereof. In particular, a styrene-ethylene-butylene-styrene copolymer (SEBS) is preferred.

The position of the functional group in the modified polymer (III) is not particularly limited. The functional group may be in the molecular chain or at a molecular end, or it may be grafted.

Examples of the functional group contained in the modified polymer (III) include a hydroxy group, a carboxyl group, a carbonyl group, a thiocarbonyl group, an acid halide group, an acid anhydride group, a thiocarboxylic acid group, an aldehyde group, a thioaldehyde group, a carboxylate group, an amide group, a sulfonic group, a sulfonate group, a phosphate group, a phosphoester group, an amino group, an imino group, a nitrile group, a pyridyl group, a quinoline group, an epoxy group, a thioepoxy group, a sulfide group, an isocyanate group, an isothiocyanate group, a halogenated silicon group, an alkoxy silicon group, a halogenated tin group, a boronic acid group, a boron-containing group, a boronate group, an alkoxytin group, and a phenyltin group. Particularly preferred is a polymer having at least one group selected from among a maleic anhydride group, an epoxy group, primary to tertiary amino groups, a carboxyl group, and a hydroxy group.

A method for producing the modified polymer (III) is not particularly limited, but a production method which is not preferred is that in which the resulting modified polymer (III) contains an undesirable component such as a gel, or the melt viscosity of the modified polymer is significantly increased to reduce processability.

Examples of a preferred method include a method in which a free-radical initiator is used to allow an unmodified hydrogenated block copolymer to react with an unsaturated carboxylic acid in an extruder.

The number of functional groups in the modified polymer (III) is preferably 1 to 1,000, more preferably 2 to 200 per polymer chain.

The number of functional groups can be calculated using HPLC, NMR, GPC, and the like.

The blending amount of the modified polymer (III) in the thermoplastic elastomer composition of the present embodiment is 1 to 500 parts by mass, preferably 10 to 300 parts by mass, more preferably 20 to 100 parts by mass, based on 100 parts by mass of the block copolymer (I). If the blending amount is less than 1 part by mass, dispersibility tends to be reduced to prevent good mechanical properties from being developed. Therefore, such a blending amount is not preferred. Even if the blending amount exceeds 500 parts by mass, the effect of improvement is almost not observed compared with the case where the blending amount is 500 parts by mass or less. In the present embodiment, polyolefines such as ethylene-based or propylene-based polymers may be optionally used in combination.

[Crosslinking Agent (IV)]

Conventionally known crosslinking agents can be used as the crosslinking agent (IV). Examples of the crosslinking agent include an organic peroxide, a sulfur-based compound, a phenol resin-based compound, a quinoid-based compound, a bismaleimide-based compound, an isocyanate-based compound, a thiuram-based compound, morpholine disulfide, and a hydrosilicone-based compound. These can be used in combination with a crosslinking auxiliary such as stearic acid, oleic acid, zinc stearate, and zinc oxide, a co-crosslinking agent, a vulcanization accelerator, and the like.

The crosslinking agent (IV) is preferably a phenol resin-based compound, a quinoid-based compound, and a bismaleimide-based compound so that it selectively acts on the unsaturated group of the polymer block (C) to improve the elongation at break in the thermoplastic elastomer composition finally obtained.

In addition, a physical crosslinking method by electron beams, radiation, and the like can also be used.

The amount of the crosslinking agent used varies with a crosslinking method. For example, in the case where the unsaturated group of the polymer block (C) is crosslinked, the amount of the crosslinking agent used is preferably 0.01 to 50 parts by mass, more preferably 0.1 to 30 parts by mass based on 100 parts by mass of the block copolymer (I). If the amount of the crosslinking agent used is less than 0.01 part by mass, sufficient crosslinkage cannot be formed in the polymer block (C). On the other hand, if the amount exceeds the 50 parts by mass, a rubber softener (V) to be described below may bleed out; mechanical properties may be reduced; and so on.

[Rubber Softener (V)]

The thermoplastic elastomer composition of the present embodiment may be made to contain a rubber softener (V) if needed.

The type of the rubber softener (V) is not particularly limited, and any one of a mineral oil-based softener and/or a synthetic resin-based softener can be used.

The mineral oil-based softener is generally a mixture of an aromatic hydrocarbon, a naphthenic hydrocarbon, and a paraffinic hydrocarbon. The mixture in which the number of carbon atoms of a paraffinic hydrocarbon is 50% or more of the total number of carbon atoms is called a paraffinic oil. On the other hand, the mixture in which the number of carbon atoms of a naphthenic hydrocarbon is 30 to 45% of the total number of carbon atoms is called a naphthenic oil, and the mixture in which the number of carbon atoms of an aromatic hydrocarbon is 35% or more of the total number of carbon atoms is called an aromatic oil.

Among them, a rubber softener suitably used is a paraffinic oil.

A suitably used paraffinic oil has a kinematic viscosity at 40° C. of 20 to 800 cst (centistokes), particularly 50 to 600 cst, a fluidity of 0 to −40° C., particularly 0 to −30° C., and a flash point (COC method) of 200 to 400° C., particularly 250 to 350° C.

In addition, the synthetic resin-based softener includes polybutene and a low molecular weight polybutadiene, all of which can be used.

The rubber softener can be arbitrarily added in an amount of 0 to 300 parts by mass based on 100 parts by mass of the hydrogenated block copolymer. The amount is more preferably 0 to 200 parts by mass, further preferably 0 to 100 parts by mass.

It is not necessary to add the rubber softener if the thermoplastic elastomer composition of the present embodiment has a fluidity, flexibility, and hardness sufficient for processing and molding without adding the rubber softener.

If the content of the rubber softener exceeds 300 parts by mass, the rubber softener will tend to bleed out and the mechanical properties of the dynamically vulcanized alloy and a molded article thereof will tend to be reduced.

[Method for Producing Thermoplastic Elastomer Composition]

The thermoplastic elastomer composition in the present embodiment is produced by dynamically crosslinking the components as described above under a melting condition (dynamic crosslinking). The method of dynamic crosslinking is not particularly limited, and a conventionally known method can be used.

The "dynamic crosslinking" refers to a treatment in which a composition in a molten state is crosslinked while kneading using a melt kneading apparatus such as an extruder, a kneader, and a mixer.

The thermoplastic elastomer composition obtained by this technique includes a matrix phase composed of the polar resin (II) and a flexible phase (dispersed particles) composed of the block copolymer (I) and/or the modified polymer (III) crosslinked by the crosslinking agent (IV) finely dispersed in the matrix phase. The composition has a unique dispersed form that is not observed in the case of non-dynamic (static) crosslinking treatment, which is advantageous for the development of thermoplasticity of a crosslinked composition.

Any of the melt kneading apparatus capable of uniformly mixing each component can be used as a production apparatus, and examples include a single-screw extruder, a twin-screw extruder, a kneader, and a Banbury mixer. Especially, a twin-screw extruder having a large shearing force and allowing continuous running is preferred.

The "melt kneading" means mixing a composition in a molten state at a temperature of the melting point of the composition or above. The temperature condition is preferably 100 to 300° C., more preferably 150 to 270° C.

The thermoplastic elastomer composition of the present embodiment can be optionally blended with any filler and flame retardant. The filler and flame retardant are not particularly limited as long as they are generally used for blending with a polar resin or a rubber-like polymer.

Examples of the filler include inorganic fillers such as silica, calcium carbonate, magnesium carbonate, magnesium hydroxide, aluminum hydroxide, calcium sulfate, barium sulfate, carbon black, glass fiber, glass beads, glass balloons, glass flakes, graphite, titanium oxide, potassium titanate whisker, carbon fiber, alumina, kaolin clay, silicic acid, calcium silicate, quartz, mica, talc, clay, zirconia, potassium titanate, alumina, and metal particles, and organic fillers such as wooden chip, wooden powder, and pulp. The shape of the filler includes, but is not limited to, a scaly shape, a spherical shape, a granular shape, a powdery shape, and an amorphous shape. These can be used singly or in combination of two or more.

The flame retardant includes halogenated compounds containing bromine, or phosphorus compounds such as phosphorus aromatic compounds, phosphoric ester-based compounds, and metal hydroxides. In recent years, inorganic flame retardants have come to be preferably used due to an environmental problem and the like.

Examples of the inorganic flame retardant include metal hydroxides such as magnesium hydroxide, aluminum hydroxide, and calcium hydroxide, metal oxides such as zinc borate and barium borate, as well as calcium carbonate, clay, basic magnesium carbonate, and mainly hydrous metal compounds, such as hydrotalcite.

In the present embodiment, metal hydroxides such as magnesium hydroxide and phosphorus compound flame retardants are preferred among the above flame retardants in terms of improvement in flame retardancy.

Note that it is also possible to use a flame retardant-based which exhibits only low flame retardancy by itself but synergistically exhibits higher effect when used in combination with another compound, or a known flame retardant can be used in combination with a known flame retardant auxiliary.

The filler and the flame retardant may be previously surface-treated with a surface-treating agent such as a silane coupling agent before they are used.

Further, these filler and flame retardant may be used singly or in combination of two or more. When they are used in combination, the combination may include, but is not limited to, a combination of filler components, a combination of flame retardant components, and a combination of a filler and a flame retardant.

To the thermoplastic elastomer composition of the present embodiment, there may be optionally added other additives described in "Chemicals to be Incorporated into Rubber and Plastics" (edited by Rubber Digest Co., Ltd.) and the like or mixtures thereof.

[Molded Product]

The thermoplastic elastomer composition of the present embodiment can be used as various molded products.

Examples of applicable a molding method include extrusion molding, injection molding, blow molding, pressure molding, vacuum molding, foam molding, multiple layer extrusion molding, multiple layer injection molding, high frequency fusion molding, slush molding, and calender molding.

With respect to the thermoplastic elastomer composition of the present embodiment, the surface of the molded article thereof can be optionally subjected to printing, coating, and decoration such as embossing for the purpose of improving appearance, weatherability, scratch resistance, and the like.

When performing a surface treatment in order to improve printability, coatability, and the like, the surface treatment method is not particularly limited, and a physical method, a chemical method, and the like can be used. Examples of the surface treatment method include corona discharge treatment, ozone treatment, plasma treatment, flame treatment, and acid-alkali treatment.

Among these, the corona discharge treatment is preferred in terms of the ease of operation, cost, continuous treatment being possible, and the like.

[Applications]

The thermoplastic elastomer composition can be optionally blended with various additives for use in various applications. The specific embodiments thereof that can be suitably used include (i) reinforcing filler compounds, (ii) crosslinked products, (iii) foams, (iv) molded articles such as multilayer films and multilayer sheets, (v) building materials, (vi) vibration control soundproof materials, (vii) wire coating materials, (viii) high frequency fusion compositions, (ix) slush molding materials, (x) adhesive compositions, (xi) asphalt compositions, (xii) medical supply materials, (xiii) automobile materials, and the like.

Examples of the applications of the molded articles include sheets, films, tubes, nonwoven fabrics, fibrous molded articles, synthetic leather, and the like. Specifically, they can be used for food packaging materials, medical supply materials, home electronics and parts thereof, electron devices and parts thereof, automobile parts, industrial components, household articles, raw materials for toys, raw materials for footwear, fiber materials, raw materials for adhesives, asphalt modifiers, and the like.

Examples of the automobile parts include side malls, grommets, knobs, weather strips, window frames and sealing materials thereof, armrests, door grips, handle grips, console boxes, bedrests, instrument panels, bumpers, spoilers, storage covers of air bag devices, and the like.

Examples of the medical supply include blood bags, platelet storage backs, infusion solution (drug solution) bags, bags for artificial dialysis, medical tubing, catheters, and the like.

The molded products can be further used for industrial or foodstuff hoses, cleaner hoses, packing for electric refrigerators, various covering materials for electric wire and others, covering materials for grips, flexible dolls, adhesive tape-, sheet- and film-substrates, surface protective film-substrates and adhesives for the films, adhesives for carpets, films for stretch packaging, thermally shrinkable films, coating materials for coated steel pipes, sealants and the like.

EXAMPLES

Hereinafter, the present invention will be described more specifically by way of Examples and Comparative Examples, but the scope of the present invention is not limited thereto.

In Examples and Comparative Examples below, characteristics and physical properties of polymers were measured as follows.

I. Evaluations of Hydrogenated Block Copolymers (I-1) Styrene Content of Hydrogenated Block Copolymer The styrene content was measured using a non-hydrogenated block copolymer by an ultraviolet spectrophotometer (UV-2450, manufactured by Shimadzu Corp.).

(I-2) Polystyrene Block Content of Hydrogenated Block Copolymer

The polystyrene block content was measured using a non-hydrogenated block copolymer by the osmium tetroxide oxidative decomposition method described in I. M. Kolthoff, et al., J. Polym. Sci. 1, 429 (1946). For decomposition of the copolymer, there was used a solution of 0.1 g of osmic acid in 125 ml of tert-butanol.

(I-3) Vinyl Bond Content of Hydrogenated Block Copolymer

The vinyl bond content was measured using a non-hydrogenated block copolymer by an infrared spectrophotometer (FT/IR-230, manufactured by JASCO Corp.). The vinyl bond content of the block copolymer was calculated by the Hampton method.

(I-4) Molecular Weight and Molecular Weight Distribution of Hydrogenated Block Copolymer These were measured by GPC (apparatus: HLC-8220, manufactured by Tosoh Corp.; column: TSKgel SuperH-RC×2 columns).

Tetrahydrofuran was used as a solvent, and the measurement was performed at 35° C.

The weight-average molecular weight in terms of polystyrene was determined using a calibration curve prepared using commercially available standard polystyrenes whose weight-average molecular weight and number-average molecular weight are known.

Note that the molecular weight distribution is a ratio of the weight-average molecular weight (Mw) to the number-average molecular weight (Mn).

(I-5) The Degree of Hydrogenation of the Double Bond of the Conjugated Diene Monomer Unit in Hydrogenated Block Copolymer, and Isoprene Content in Hydrogenated Block Copolymer These were measured using a hydrogenated block copolymer with a nuclear magnetic resonance spectrometer (DPX-400, manufactured by BRUKER CORP. (Germany)).

II. Properties of Dynamically Vulcanized Thermoplastic Elastomer Compound (II-1) Tensile Strength and Elongation at Break These were measured using dumbbell No. 3 at a crosshead speed of 20 mm/min according to JIS K6251.

(II-2) Heat Resistance

The compression set test was carried out according to JIS K6251.

Two types of measuring conditions were used, that is, at a temperature of 100° C. for 22 hours and at 120° C. for 22 hours.

(II-3) Oil Resistance

Press sheets each having a thickness of 2 mm produced in Examples and Comparative Examples to be described below were immersed in IRM#903 oil at 120° C. for 24 hours, and the rate of weight change (%) before and after immersion was measured.

(II-4) Abrasion Resistance 1 (Measurement of the Residual Rate of the Embossing Depth)

The surface of molded sheets (leather texture, embossing depth: about 90 μm) produced in Examples and Comparative Examples to be described below was rubbed with a friction cloth, Canequim No. 3 cotton cloth, at a load of 500 g using a Gakushin-type rubbing tester (model: AB-301, manufactured by Tester Sangyo Co., Ltd.,).

Then, the embossing depth was measured to determine the abrasion resistance 1 by the residual rate of the embossing depth (calculated by the following expression 1) according to the following criteria.

The embossing depth was measured by a surface roughness tester, E-35A, manufactured by Tokyo Seimitsu Co., Ltd.

The residual rate of embossing depth=(embossing depth after rubbing)/(embossing depth before rubbing)×100 (Expression 1)

⊚: The residual rate of embossing depth after 5,000 times of rubbing was 75% or more.

◯): The residual rate of embossing depth after 5,000 times of rubbing was less than 75% and 50% or more.

Δ: The residual rate of embossing depth after 5,000 times of rubbing was less than 50% and 25% or more.

X: The residual rate of embossing depth after 5,000 times of rubbing was less than 25%

(II-5) Abrasion Resistance 2 (Surface State after Rubbing)

The sheet surface after rubbing by the Gakushin-type rubbing tester in (II-4) as described above was touched with a finger to confirm the presence or absence of a tacky feeling (stickiness), and the abrasion resistance 2 was determined according to the following criteria.

◯): Stickiness was absent after finishing the rubbing.

X: Stickiness was present after finishing the rubbing.
[0075]
(II-6) Surface Feeling Press sheets each having a thickness of 2 mm were produced in Examples and Comparative Examples to be described below. The sheet surface was touched with a finger to confirm the presence or absence of a tacky feeling (stickiness), and the surface feeling was determined according to the following criteria.

◯): The sheet surface was not sticky.

X: The sheet surface was sticky.

Each blended component is shown below.

<Preparation of Hydrogenation Catalyst>

The hydrogenation catalyst used for the hydrogenation reaction of a block copolymer was prepared by the following method.

To a reaction vessel, the atmosphere of which had been replaced with nitrogen, was charged 1 liter of dried and purified cyclohexane. Thereto was added 100 mmol of bis(cyclopentadienyl) titanium dichloride. To the mixture was added a n-hexane solution containing 200 mmol of trimethylaluminum with sufficient stirring, and the resulting mixture was allowed to react at room temperature for about 3 days.

[Preparation of Hydrogenated Block Copolymer]

<Polymer 1: Hydrogenated Product of Styrene-Isoprene-Butadiene-Isoprene-Styrene>

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 15 parts by mass of styrene based on 100 parts by mass of the total monomers was charged into the reactor. Then, thereto was added 0.05 part by mass of n-butyl lithium and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 1.5 parts by mass of isoprene, and the resulting mixture was polymerized for 30 minutes at 70° C.

Next, thereto was added a cyclohexane solution containing 67 parts by mass of butadiene, and the resulting mixture was polymerized for 1 hour at 70° C.

Next, thereto was added a cyclohexane solution containing 1.5 parts by mass of isoprene, and the resulting mixture was polymerized for 30 minutes at 70° C.

Finally, thereto was added a cyclohexane solution containing 15 parts by mass of styrene, and the resulting mixture was polymerized for 30 minutes at 70° C. to obtain a polymer.

Note that the above "total monomers" means the sum of the monomers for forming a polymer which is the polymer 1 before hydrogenation. This is the same in the following examples.

The polymer obtained by the above steps had a styrene content of 30% by mass, a polystyrene block content of 29.8% by mass, an isoprene content of 3% by mass, a vinyl bond content of a polybutadiene block part of 35%, a molecular weight of the entire polymer of 77,000, a molecular weight of the polystyrene block of 23,000, and a molecular weight distribution of 1.04.

Next, to the resulting polymer was added 100 ppm of the above hydrogenation catalyst in terms of titanium based on 100 parts by mass of the polymer, and hydrogenation reaction was performed at a hydrogen pressure of 0.7 MPa and at a temperature of 65° C. followed by addition of methanol. Next, to the resulting mixture was added 0.3 part by mass of octadecyl-3-(3,5-di-t-butyl-4-hydroxyphenyl)propionate as a stabilizer based on 100 parts by mass the polymer.

With respect to the degree of hydrogenation of the resulting hydrogenated block copolymer (Polymer 1), the degree of hydrogenation of butadiene was 98%, and that of isoprene was 3%.

<Polymer 2: Hydrogenated Product of Isoprene-Styrene-Butadiene-Styrene-Isoprene>

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 1.5 parts by mass of isoprene based on 100 parts by mass of the total monomers was charged into the reactor. Then, thereto was added 0.05 part by mass of n-butyl lithium relative to 100 parts by mass of the total monomers and 0.55 mol of tetramethylethylenediamine (TMEDA) relative to 1 mol of the n-butyl lithium, and the resulting mixture was polymerized for 30 minutes at 70° C.

Then, thereto was added a cyclohexane solution containing 15 parts by mass of styrene, and the resulting mixture was polymerized for 30 minutes at 70° C.

Next, thereto was added a cyclohexane solution containing 67 parts by mass of butadiene, and the resulting mixture was polymerized for 1 hour at 70° C.

Next, thereto was added a cyclohexane solution containing 15 parts by mass of styrene, and the resulting mixture was polymerized for 30 minutes at 70° C.

Finally, thereto was added a cyclohexane solution containing 1.5 parts by mass of isoprene, and the resulting mixture was polymerized for 30 minutes at 70° C. to obtain a polymer.

The polymer obtained by the above steps had a styrene content of 30% by mass, a polystyrene block content of 29.7% by mass, an isoprene content of 3% by mass, a vinyl bond content of a polybutadiene block part of 35%, a molecular weight of the entire polymer of 78,000, a molecular weight of the polystyrene block of 23,000, and a molecular weight distribution of 1.04.

Next, to the resulting polymer was added 100 ppm of the above hydrogenation catalyst in terms of titanium based on 100 parts by mass of the polymer, and hydrogenation reaction was performed at a hydrogen pressure of 0.7 MPa and at a temperature of 65° C. followed by addition of methanol.

Next, to the resulting mixture was added 0.3 part by mass of octadecyl-3-(3,5-di-t-butyl-4-hydroxyphenyl)propionate as a stabilizer based on 100 parts by mass the polymer.

With respect to the degree of hydrogenation of the resulting hydrogenated block copolymer (Polymer 2), the degree of hydrogenation of butadiene was 98%, and that of isoprene was 4%.

<Polymer 3: Hydrogenated Product of 1,3-Cyclohexadiene-Styrene-Butadiene-Styrene-1,3-Cyclohexadiene>

In the <Polymer 2> as described above, cyclohexadiene was used in place of isoprene.

A polymer was produced, with other conditions being the same as those for the above <Polymer 2>, and the polymer was hydrogenated to obtain the <Polymer 3>.

With respect to the degree of hydrogenation of the resulting hydrogenated block copolymer (Polymer 3), the degree of hydrogenation of butadiene was 98%, and that of cyclohexadiene was 0%.

<Polymer 4: Hydrogenated Product of Isoprene/Styrene-Butadiene-Isoprene/Styrene>

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 1.5 parts by mass of isoprene and 15 parts by mass of styrene based on 100 parts by mass of the total monomers was charged into the reactor. Then, thereto was added 0.05 part by mass of n-butyl lithium relative to 100 parts by mass of the total monomers and 0.7 mol of TMEDA relative to 1 mol of the n-butyl lithium, and the resulting mixture was polymerized for 30 minutes at 70° C.

Then, thereto was added a cyclohexane solution containing 67 parts by weight of butadiene, and the resulting mixture was polymerized for 30 minutes at 70° C.

Finally, thereto was added a cyclohexane solution containing 1.5 parts by mass of isoprene and 15 parts by mass of styrene, and the resulting mixture was polymerized for 30 minutes at 70° C. to obtain a polymer.

The resulting polymer had a styrene content of 30% by weight, a polystyrene block content of 30% by weight, an isoprene content of 3% by weight, a vinyl bond content of a polybutadiene homoblock part of 48%, a molecular weight of the entire polymer of 78,000, and a molecular weight distribution of 1.10.

Next, the resulting polymer was hydrogenated in the same manner as in <Polymer 1> to obtain the hydrogenated block copolymer <Polymer 4>.

With respect to the degree of hydrogenation of the resulting hydrogenated block copolymer (Polymer 4), the degree of hydrogenation of butadiene was 99%, and that of isoprene was 3%.

<Polymer 5: Hydrogenated Product of Styrene-Butadiene-Styrene>

A polymer (before hydrogenation) was produced in the same manner as in the <Polymer 1> as described above.

First, a cyclohexane solution containing 15 parts by mass of styrene based on 100 parts by mass of the total monomers was charged into the reactor. Then, thereto was added 0.05 part by mass of n-butyl lithium relative to 100 parts by mass of the total monomers and 0.55 mol of TMEDA (tetramethylethylenediamine) relative to 1 mol of the n-butyl lithium, and the resulting mixture was polymerized for 30 minutes at 70° C.

Then, thereto was added a cyclohexane solution containing 70 parts by mass of butadiene, and the resulting mixture was polymerized for 1 hour at 70° C.

Finally, thereto was added a cyclohexane solution containing 15 parts by mass of styrene, and the resulting mixture was polymerized for 30 minutes at 70° C. to obtain a polymer.

The resulting polymer had a styrene content of 30% by mass, a polystyrene block content of 29.5% by mass, a vinyl bond content of a polybutadiene block part of 36%, a molecular weight of the entire polymer of 80,000, a molecular weight of the polystyrene block of 23,000, and a molecular weight distribution of 1.03.

Next, the above polymer was used in the hydrogenation reaction in the same manner as in the <Polymer 1> described above to obtain the hydrogenated block copolymer <Polymer 5>.

With respect to the degree of hydrogenation of the resulting hydrogenated block copolymer (Polymer 5), the degree of hydrogenation of butadiene was 99%.

<Polymer 6: Hydrogenated Product of Isoprene-Styrene-Butadiene-Styrene/Butadiene-Styrene-Isoprene>

A vessel-type reactor having an internal volume of 10 L and equipped with a stirrer and a jacket was washed and dried, and the atmosphere of the reactor was then replaced with nitrogen for performing batch polymerization.

First, a cyclohexane solution containing 1.5 parts by mass of isoprene based on 100 parts by mass of the total monomers was charged into the reactor. Then, thereto was added 0.05 part by mass of n-butyl lithium relative to 100 parts by mass of the total monomers and 0.7 mol of TMEDA relative to 1 mol of the n-butyl lithium, and the resulting mixture was polymerized for 30 minutes at 70° C.

Then, thereto was added a cyclohexane solution containing 15 parts by mass of styrene, and the resulting mixture was polymerized for 30 minutes at 70° C.

Next, thereto was added a cyclohexane solution containing 17 parts by mass of butadiene, and the resulting mixture was polymerized for 30 minutes at 70° C.

Next, thereto was added a cyclohexane solution containing 15 parts by mass of butadiene and 35 parts by mass of styrene, and the resulting mixture was polymerized for 1 hour at 70° C.

Next, thereto was added a cyclohexane solution containing 15 parts by mass of styrene, and the resulting mixture was polymerized for 30 minutes at 70° C.

Finally, thereto was added a cyclohexane solution containing 1.5 parts by mass of isoprene, and the resulting mixture was polymerized for 30 minutes at 70° C. to obtain a polymer.

The resulting polymer had a styrene content of 65% by mass, a polystyrene block content of 30% by mass, an isoprene content of 3% by mass, a vinyl bond content of a polybutadiene homoblock part of 48%, a vinyl bond content of a butadiene-styrene copolymer block part of 13%, a molecular weight of the entire polymer of 75,000, and a molecular weight distribution of 1.10.

Next, the above polymer was used in the hydrogenation reaction in the same manner as in the <Polymer 1> described above to obtain the hydrogenated block copolymer <Polymer 6>.

With respect to the degree of hydrogenation of the resulting hydrogenated block copolymer (Polymer 6), the degree of hydrogenation of butadiene was 99%, and that of isoprene was 4%.

<Polymer 7: Hydrogenated Product of Styrene-Butadiene-Styrene/Butadiene-Styrene>

A polymer (before hydrogenation) was produced in the same manner as in the <Polymer 1> as described above.

First, a cyclohexane solution containing 15 parts by mass of styrene based on 100 parts by mass of the total monomers was charged into the reactor. Then, thereto was added 0.05 part by mass of n-butyl lithium relative to 100 parts by mass of the total monomers and 0.7 mol of TMEDA relative to 1 mol of the n-butyl lithium, and the resulting mixture was polymerized for 30 minutes at 70° C.

Next, thereto was added a cyclohexane solution containing 20 parts by mass of butadiene, and the resulting mixture was polymerized for 30 minutes at 70° C.

Next, thereto was added a cyclohexane solution containing 15 parts by mass of butadiene and 35 parts by mass of styrene, and the resulting mixture was polymerized for 1 hour at 70° C.

Finally, thereto was added a cyclohexane solution containing 15 parts by mass of styrene, and the resulting mixture was polymerized for 30 minutes at 70° C.

The resulting polymer had a styrene content of 65% by mass, a polystyrene block content of 30% by mass, a vinyl bond content of a polybutadiene homoblock part of 50%, a vinyl bond content of a butadiene-styrene copolymer block part of 12%, a molecular weight of the entire polymer of 76,000, and a molecular weight distribution of 1.11.

Next, the above polymer was used in the hydrogenation reaction in the same manner as in the <Polymer 1> described above to obtain the hydrogenated block copolymer <Polymer 7>.

With respect to the degree of hydrogenation of the resulting hydrogenated block copolymer (Polymer 7), the degree of hydrogenation of butadiene was 98%.

<Polar Resin>

Polyamide resin Trade name: Amilan (manufactured by Toray Industries, Inc.)

<Modified Polymer>

Maleic anhydride-modified SEBS Trade name: TUFTEC M1913 (manufactured by Asahi Kasei Chemicals Corporation)<

<Crosslinking Agent>

Polymethylol phenol resin Trade name: TACKROL 250-1 (manufactured by Taoka Chemicals Co., Ltd.)

<Crosslinking Auxiliary>

Zinc oxide (manufactured by Wako Pure Chemical Industries, Ltd.)

Example 1

The above <Polymer 1>, polyamide resin (Amilan), maleic anhydride-modified SEBS (TUFTEC M1913), polymethylol phenol resin (TACKROL 250-1), and zinc oxide were melt kneaded according to the parts by mass ratio as described in the following Table 1 using a twin-screw extruder (manufactured by Toyo Seiki Seisaku-sho, Ltd.) under a cylinder temperature of 270° C. and a screw rotation speed of 250 rpm to produce a thermoplastic elastomer composition.

The resulting thermoplastic elastomer composition was used to produce a sheet having a thickness of 2 mm at a temperature of 250° C. with an injection molding machine (manufactured by Toyo Seiki Seisaku-sho, Ltd.) as a test piece for measuring physical properties.

Example 2

The above <Polymer 2> was used in place of the above <Polymer 1>. A thermoplastic elastomer composition was produced, with other conditions being the same as those of Example 1, from which was produced a sheet having a thickness of 2 mm as a test piece for measuring physical properties.

Example 3

The above <Polymer 3> was used in place of the above <Polymer 1>. A thermoplastic elastomer composition was produced, with other conditions being the same as those of Example 1, from which was produced a sheet having a thickness of 2 mm as a test piece for measuring physical properties.

Example 4

The above <Polymer 4> was used in place of the above <Polymer 1>. A thermoplastic elastomer composition was produced, with other conditions being the same as those of Example 1, from which was produced a sheet having a thickness of 2 mm as a test piece for measuring physical properties.

Comparative Example 1

The above <Polymer 5> was used in place of the above <Polymer 1>. A thermoplastic elastomer composition was produced, with other conditions being the same as those of Example 1, from which was produced a sheet having a thickness of 2 mm as a test piece for measuring physical properties.

Comparative Example 2

Without adding a crosslinking agent and a crosslinking auxiliary, the <Polymer 1>, the polyamide resin (Amilan), and the maleic anhydride-modified SEBS (TUFTEC M1913) were melt kneaded according to the parts by mass ratio as described in the following Table 1 using a twin-screw extruder (manufactured by Toyo Seiki Seisaku-sho, Ltd.) under a cylinder temperature of 270° C. and a screw rotation speed of 250 rpm to produce a thermoplastic elastomer composition.

The resulting thermoplastic elastomer composition was used to produce a sheet having a thickness of 2 mm at a temperature of 250° C. with an injection molding machine (manufactured by Toyo Seiki Seisaku-sho, Ltd.) as a test piece for measuring physical properties.

Comparative Example 3

The above <Polymer 2> was used in place of the above <Polymer 1>. A thermoplastic elastomer composition was produced, with other conditions being the same as those of Comparative Example 2, from which was produced a sheet having a thickness of 2 mm as a test piece for measuring physical properties.

Comparative Example 4

Without using maleic anhydride-modified SEBS (TUFTEC M1913), the above <Polymer 1>, polyamide resin (Amilan), the polymethylol phenol resin (TACKROL 250-1), and zinc oxide were melt kneaded according to the parts by mass ratio as described in the following Table 1 using a twin-screw extruder (manufactured by Toyo Seiki Seisaku-sho, Ltd.) under a cylinder temperature of 270° C. and a screw rotation speed of 250 rpm to produce a thermoplastic elastomer composition.

The resulting thermoplastic elastomer composition was used to produce a sheet having a thickness of 2 mm at a temperature of 250° C. with an injection molding machine (manufactured by Toyo Seiki Seisaku-sho, Ltd.) as a test piece for measuring physical properties.

Example 5

The above <Polymer 6> was used in place of the above <Polymer 1>. A thermoplastic elastomer composition was produced, with other conditions being the same as those of Example 1, from which was produced a sheet having a thickness of 2 mm as a test piece for measuring physical properties.

Comparative Example 5

The above <Polymer 7> was used in place of the above <Polymer 1>. A thermoplastic elastomer composition was produced, with other conditions being the same as those of Example 1, from which was produced a sheet having a thickness of 2 mm as a test piece for measuring physical properties.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| "Formulation" | | | | | | | | |
| Polymer 1 (parts by mass) | 100 | | | | | 100 | | 100 |
| Polymer 2 (parts by mass) | | 100 | | | | | 100 | |
| Polymer 3 (parts by mass) | | | 100 | | | | | |
| Polymer 4 (parts by mass) | | | | 100 | | | | |
| Polymer 5 (parts by mass) | | | | | 100 | | | |
| Polyamide resin (parts by mass) | 50 | 50 | 50 | 50 | 50 | 50 | 50 | 50 |
| Modified SEBS (parts | 20 | 20 | 20 | 20 | 20 | 20 | 20 | |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| by mass) |  |  |  |  |  |  |  |  |
| Crosslinking agent (parts by mass) | 20 | 20 | 20 | 20 | 20 |  |  | 20 |
| Zinc oxide (parts by mass) | 6 | 6 | 6 | 6 | 6 |  |  | 6 |
| "Physical properties" |  |  |  |  |  |  |  |  |
| Tensile strength (MPa) | 33 | 32 | 31 | 29 | 31 | 31 | 30 | 28 |
| Elongation at break (%) | 520 | 500 | 490 | 450 | 510 | 500 | 480 | 430 |
| Compression set at 100° C. (%) | 54 | 58 | 59 | 62 | 70 | 70 | 72 | 64 |
| Compression set at 120° C. (%) | 58 | 63 | 63 | 67 | 77 | 76 | 78 | 70 |
| Oil resistance (%) | 38 | 42 | 43 | 45 | Melted | Melted | Melted | 46 |

As shown in Table 1, each of the thermoplastic elastomer compositions of Examples 1 to 4 was excellent in mechanical properties such as tensile strength and elongation at break, and had a compression set that is small enough in practice, good heat resistance, and good oil resistance.

Since the thermoplastic elastomer composition of Comparative Example 1 contained no unsaturated block, it was not crosslinked and did not give sufficient physical properties in practice.

Since no crosslinking agent was added to the thermoplastic elastomer compositions of Comparative Examples 2 and 3, they were poorer than those of Examples as described above in heat resistance and oil resistance.

Since the modified polymer was not used in the thermoplastic elastomer composition of Comparative Example 4, the rubber component could not be finely dispersed in the composition. As a result, it was poorer than the compositions of Examples as described above in all of the mechanical properties, heat resistance, and oil resistance.

TABLE 2

|  | Example 5 | Comparative Example 5 |
|---|---|---|
| "Formulation" |  |  |
| Polymer 6 (parts by mass) | 100 |  |
| Polymer 7 (parts by mass) |  | 100 |
| Polyamide resin (parts by mass) | 50 | 50 |
| Modified SEBS (parts by mass) | 20 | 20 |
| Crosslinking agent (parts by mass) | 20 | 20 |
| Zinc oxide (parts by mass) | 6 | 6 |
| "Physical properties" |  |  |
| Compression set at 100° C. (%) | 67 | 78 |
| Residual rate of embossing depth | ◎ | Δ |
| Surface state after rubbing | ○ | X |
| Surface feeling | ○ | X |

As shown in Table 2, the thermoplastic elastomer composition of Example 5 showed a significant effect of crosslinking and achieved good results in compression set, residual rate of embossing depth, surface state after rubbing, and surface feeling.

On the other hand, since the thermoplastic elastomer composition of Comparative Example 5 was not crosslinked because it contained no unsaturated block, it was poorer than the composition of Example 5 described above.

This application is based on Japanese Patent Application (No. 2008-028373) filed to the Japanese Patent Office on Feb. 8, 2008, the contents of which are incorporated herein by reference.

INDUSTRIAL APPLICABILITY

The thermoplastic elastomer composition of the present invention is excellent in heat resistance, oil resistance, and rubber elasticity at high temperatures, and also has good molding processability and flexible and good rubber properties. Therefore, it has industrial applicability in various molded articles including automobile parts, civil engineering and building applications, household appliance parts, sporting goods, sundry articles and stationery, and in other wide fields.

The invention claimed is:

1. A thermoplastic elastomer composition obtained by dynamically crosslinking, under a melting condition,
   100 parts by mass of a block copolymer (I),
   1 to 1,000 parts by mass of a polar resin (II),
   1 to 500 parts by mass of a modified polymer (III), and
   0.01 to 50 parts by mass of a crosslinking agent (IV),
   wherein the block copolymer (I) is a hydrogenated block copolymer obtained by hydrogenation reaction of a non-hydrogenated block copolymer,
   wherein the block copolymer (I) comprises
   at least one polymer block (A) comprising as a main component polymerized alkylene units, and/or
   at least one copolymer block (B) comprising as a main component copolymerized alkylene units (b-1) and a vinyl aromatic monomer units (b-2), and comprises
   at least one unsaturated block (C) comprising as a main component polymerized conjugated diene monomer units having 5 or more carbon atoms at an end;
   wherein the block copolymer (I) further comprises at least one polymer block (D) comprising as a main component polymerized vinyl aromatic monomer units at each of both ends,
   wherein the at least one unsaturated block (C) is internally bonded to the at least one polymer block (D), and the at least one polymer block (D) is an outermost polymer block,
   wherein the degree of hydrogenation of the double bond of the conjugated diene monomer unit having 5 or more carbon atoms in the unsaturated block (C) is 40% or less, and wherein a content of the unsaturated block (C) in the block copolymer (I) is from 0.1 to 20% by mass.

2. The thermoplastic elastomer composition according to claim 1, wherein a conjugated diene of the unsaturated block (C) is isoprene.

3. The thermoplastic elastomer composition according to claim 1, wherein a vinyl bond content of all the conjugated dienes contained in the non-hydrogenated block copolymer is from 15 to 80%.

4. The thermoplastic elastomer composition according to claim 1, wherein a content of the vinyl aromatic monomer in the block copolymer (I) is from 5 to 70% by mass.

5. The thermoplastic elastomer composition according to claim 1, wherein the modified polymer (III) is a modified polymer having at least one functional group selected from the group consisting of a maleic anhydride group, an epoxy group, primary to tertiary amino groups, a carboxyl group, and a hydroxy group.

6. The thermoplastic elastomer composition according to claim 1, wherein the polar resin (II) is at least one polar thermoplastic resin selected from the group consisting of a polyester-based resin, a polyamide-based resin, a polycarbonate-based resin, a polyurethane-based resin, a polyphenylene ether-based resin, and a polyoxymethylene-based resin.

7. The thermoplastic elastomer composition according to claim 1, wherein the crosslinking agent (IV) is a phenol resin-based crosslinking agent or an organic peroxide-based crosslinking agent.

8. The thermoplastic elastomer composition according to claim 1, comprising from 0 to 300 parts by mass of a rubber softener (V).

9. A method for producing a thermoplastic elastomer composition comprising a step of dynamically crosslinking, under a melting condition, using a twin-screw extruder,
    100 parts by mass of a block copolymer (I),
    1 to 1,000 parts by mass of a polar resin (II),
    1 to 500 parts by mass of a modified polymer (III), and
    0.01 to 50 parts by mass of a crosslinking agent (IV),
    wherein the block copolymer (I) comprises at least one polymer block (A) comprising as a main component polymerized alkylene units, and/or at least one copolymer block (B) comprising as a main component copolymerized alkylene units (b-1) and vinyl aromatic monomer units (b-2), and comprises at least one unsaturated block (C) comprising as a main component polymerized conjugated diene monomer units having 5 or more carbon atoms at at least one end;
    wherein the block copolymer (I) is a hydrogenated block copolymer obtained by hydrogenation reaction of a non-hydrogenated block copolymer,
    wherein the block copolymer (I) further comprises at least one polymer block (D) comprising as a main component polymerized vinyl aromatic monomer units at each of both ends,
    wherein the at least one unsaturated block (C) is internally bonded to the at least one polymer block (D), and the at least one polymer block (D) is an outermost polymer block,
    wherein the degree of hydrogenation of the double bond of the conjugated diene monomer unit having 5 or more carbon atoms in the unsaturated block (C) is 40% or less, and
    wherein a content of the unsaturated block (C) in the block copolymer (I) is from 0.1 to 20% by mass.

10. The thermoplastic elastomer composition according to claim 1, wherein the at least one polymer block (D) comprises two polymer blocks (D) in the block copolymer (I).

11. The thermoplastic elastomer composition according to claim 10, wherein the at least one unsaturated block (C) comprises two unsaturated blocks (C), and each of the two unsaturated blocks (C) is internally bonded to one of the two polymer blocks (D) and each of the two polymer blocks (D) is an outermost polymer block.

12. The thermoplastic elastomer composition according to claim 1, wherein polymer block (C) has a lower hydrogenation rate than the polymer block (A) or the copolymer block (B).

13. The thermoplastic elastomer composition according to claim 11, wherein polymer block (C) has a lower hydrogenation rate than polymer block (A) or the copolymer block (B).

14. The thermoplastic elastomer composition according to claim 1, wherein the polymer block (A) is a polymer block comprising as a main component polymerized alkylene units having 4 or more carbon atoms.

15. The method according to claim 9, wherein the at least one polymer block (D) comprises two polymer blocks (D) in the block copolymer (I).

16. The method according to claim 15, wherein the at least one unsaturated block (C) comprises two unsaturated blocks (C), and each of the two unsaturated blocks (C) is internally bonded to one of the two polymer blocks (D) and each of the two polymer blocks (D) is an outermost polymer block.

17. The method according to claim 9, wherein polymer block (C) has a lower hydrogenation rate than the polymer block (A) or the copolymer block (B).

18. The method according to claim 16, wherein polymer block (C) has a lower hydrogenation rate than polymer block (A) or the copolymer block (B).

19. The method according to claim 9, wherein the polymer block (A) is a polymer block comprising as a main component polymerized alkylene units having 4 or more carbon atoms.

* * * * *

UNITED STATES PATENT AND TRADEMARK OFFICE
CERTIFICATE OF CORRECTION

PATENT NO. : 8,415,428 B2
APPLICATION NO. : 12/865407
DATED : April 9, 2013
INVENTOR(S) : Daisuke Shimizu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 99 days.

Signed and Sealed this
Ninth Day of July, 2013

Teresa Stanek Rea
*Acting Director of the United States Patent and Trademark Office*